US012491713B2

(12) United States Patent
Asami

(10) Patent No.: US 12,491,713 B2
(45) Date of Patent: Dec. 9, 2025

(54) LIQUID EJECTING APPARATUS

(71) Applicant: SEIKO EPSON CORPORATION, Tokyo (JP)

(72) Inventor: Masahiro Asami, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 158 days.

(21) Appl. No.: 18/409,619

(22) Filed: Jan. 10, 2024

(65) Prior Publication Data

US 2024/0239100 A1 Jul. 18, 2024

(30) Foreign Application Priority Data

Jan. 12, 2023 (JP) ................................ 2023-002932

(51) Int. Cl.
*B41J 2/045* (2006.01)

(52) U.S. Cl.
CPC ....... *B41J 2/04595* (2013.01); *B41J 2/04541* (2013.01); *B41J 2/04581* (2013.01); *B41J 2/04588* (2013.01); *B41J 2/04596* (2013.01); *B41J 2202/06* (2013.01)

(58) Field of Classification Search
CPC .................................................... B41J 2202/06
See application file for complete search history.

(56) References Cited

U.S. PATENT DOCUMENTS 12,227,007 B2* 2/2025 Ochi .................... B41J 2/04596
2007/0211092 A1* 9/2007 Shingyohuchi ........ B41J 2/2054 347/10
2012/0306954 A1* 12/2012 Nishikawa ........... B41J 2/04581 347/11
2014/0125722 A1* 5/2014 Otokita .................. B41J 2/0451 347/11
2014/0327714 A1* 11/2014 Iwata ................... B41J 2/04596 347/11
2017/0165964 A1* 6/2017 Misawa ............... B41J 2/04541
2022/0402264 A1* 12/2022 Wong ................... B41J 2/04588

FOREIGN PATENT DOCUMENTS

JP 2017-140761 A 8/2017

* cited by examiner

*Primary Examiner* — Shelby L Fidler
(74) *Attorney, Agent, or Firm* — WORKMAN NYDEGGER

(57) ABSTRACT

A liquid ejecting apparatus is configured to eject liquid in response to a drive signal. The drive signal includes a first ejection pulse, a plurality of second ejection pulses, and a third ejection pulse. An ejection component of the first ejection pulse changes from a first potential to a reference potential and is temporally continuous with an interpulse component. Ejection components of the second and third ejection pulses change from the first potential to a second potential. The second ejection pulses include first vibration suppression components that change from the second potential to the reference potential after the ejection components. The third ejection pulse includes a second vibration suppression component that changes from the second potential to a third potential. The reference potential is a potential between the first potential and the second potential and between the second potential and the third potential.

11 Claims, 8 Drawing Sheets

LIQUID EJECTING APPARATUS

The present application is based on, and claims priority from JP Application Serial Number 2023-002932, filed Jan. 12, 2023, the disclosure of which is hereby incorporated by reference herein in its entirety.

BACKGROUND

1. Technical Field

The present disclosure relates to a liquid ejecting apparatus.

2. Related Art

A liquid ejecting apparatus such as an ink jet printer includes a liquid ejecting head that ejects liquid such as ink in general. The liquid ejecting head includes a nozzle from which liquid is ejected, a pressure chamber communicating with the nozzle, and a drive element, such as a piezoelectric element, that changes pressure applied to liquid in the pressure chamber according to a drive signal.

For example, as disclosed in JP-A-2017-140761, such a liquid ejecting apparatus as described above sequentially ejects a plurality of droplets from a nozzle in such a way that the ejected droplets are combined before landing on a medium for the purpose of increasing the size of a dot to be formed on the medium.

JP-A-2017-140761 discloses that a drive voltage for a succeeding droplet is set to be higher than a drive voltage for a preceding droplet. By setting the flying speed of the preceding droplet to be lower than the flying speed of the succeeding droplet, these droplets can be combined before landing on a medium.

To increase the amount of a combined droplet obtained by combining a plurality of droplets, it is necessary to set the number of droplets to be ejected from a nozzle to be large while the amount of each droplet is increased as much as possible.

However, in the technique described in JP-A-2017-140761, when the number of droplets to be ejected from a nozzle is large, it is difficult to combine all of droplets at a desired position or it is necessary to significantly reduce the amount of a preceding droplet in order to reduce the flying speed of the preceding droplet. As a result, it is difficult to further increase the amount of a combined droplet obtained by combining a plurality of droplets.

SUMMARY

In order to solve the above-described problems, according to an aspect of the present disclosure, a liquid ejecting apparatus includes a head including a nozzle from which liquid is ejected toward a medium, a pressure chamber communicating with the nozzle, and a drive element that changes pressure applied to the liquid in the pressure chamber, and a drive signal generator that generates a drive signal for driving the drive element. The drive signal includes a plurality of ejection pulses that are temporally aligned corresponding to a plurality of droplets that are to be combined after being ejected from the nozzle and before landing on the medium, and cause the plurality of droplets to be sequentially ejected, and an interpulse component that is between two temporally continuous ejection pulses among the plurality of ejection pulses and is maintained at a reference potential. The plurality of ejection pulses include filling components that cause the pressure in the pressure chamber to be negative, and ejection components that cause the pressure in the pressure chamber to be positive in such a way that droplets are ejected from the nozzle. When an earliest ejection pulse among the plurality of ejection pulses is a first ejection pulse, a plurality of ejection pulses that succeed the first ejection pulse among the plurality of ejection pulses are a plurality of second ejection pulses, and a latest ejection pulse among the plurality of ejection pulses is a third ejection pulse, the ejection component of the first ejection pulse changes from a first potential to the reference potential and is temporally continuous with an interpulse component, the ejection components of the plurality of second ejection pulses and the ejection component of the third ejection pulse change from the first potential to a second potential, the plurality of second ejection pulses include first vibration suppression components that succeed the ejection components of the second ejection pulses and dampen residual vibration in the pressure chamber by changing from the second potential to the reference potential, the third ejection pulse includes a second vibration suppression component that reduces the change in the pressure in the pressure chamber by changing from the second potential to a third potential, and the reference potential is a potential between the first potential and the second potential and between the second potential and the third potential.

DESCRIPTION OF EMBODIMENTS

Figure 1:
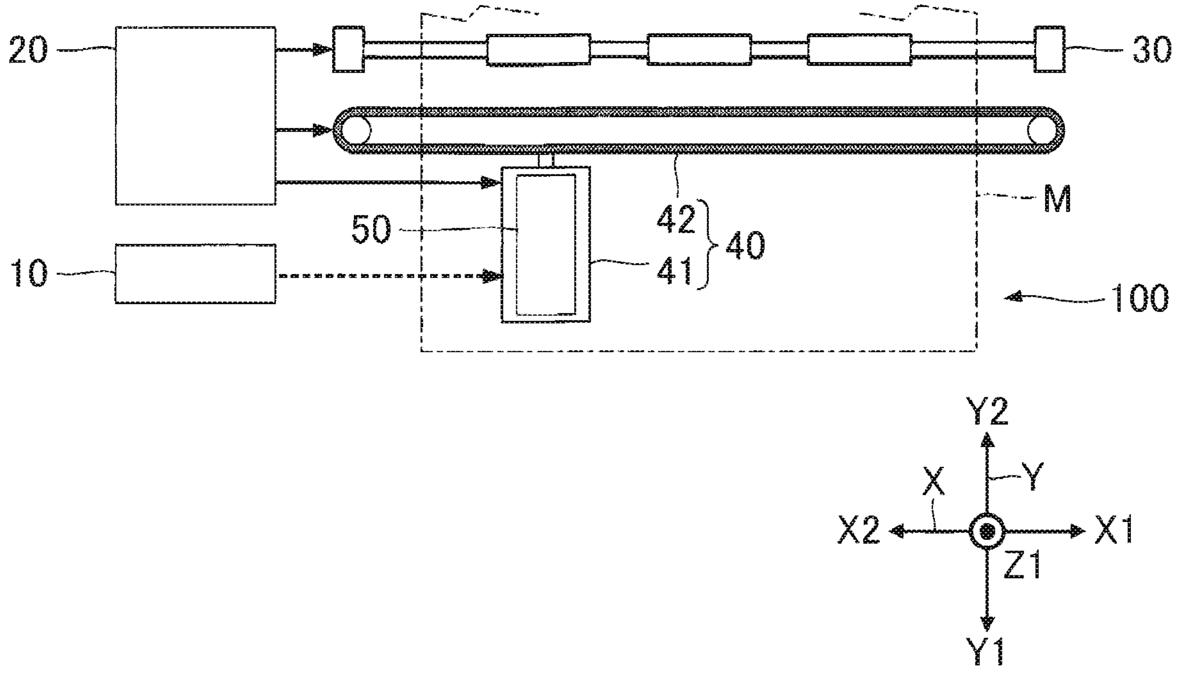
FIG. 1 is a schematic diagram illustrating an example of a configuration of a liquid ejecting apparatus according to a first embodiment.

Embodiments of the present disclosure are described below with reference to the accompanying drawings. In the drawings, dimensions and scales of components are different from the actual dimensions and scales, and some of the components are schematically illustrated for ease of understanding. The scope of the present disclosure is not limited to the embodiments unless otherwise stated to limit the present disclosure in the following description.

In the following description, an X axis, a Y axis, and a Z axis that intersect with each other are used. One direction along the X axis is referred to as an X1 direction, and a direction that extends along the X axis and is opposite to the X1 direction is referred to as an X2 direction. Similarly, directions that extend along the Y axis and are opposite to each other are referred to as a Y1 direction and a Y2 direction. Similarly, directions that extend along the Z axis and are opposite to each other are referred to as a Z1 direction and a Z2 direction.

Typically, the Z axis is a vertical axis, and the Z2 direction corresponds to a downward direction along the vertical axis. However, the Z axis may not be the vertical axis. The X axis, the Y axis, and the Z axis are typically perpendicular to each other but may not be limited thereto. For example, the X axis, the Y axis, and the Z axis may intersect with each other at an angle in a range from 80° to 100°.

A: First Embodiment

A1: Overall Configuration of Liquid Ejecting Apparatus

FIG. 1 is a schematic diagram illustrating an example of a configuration of a liquid ejecting apparatus 100 according to a first embodiment. The liquid ejecting apparatus 100 is an ink jet printing apparatus that ejects liquid such as ink as a droplet onto a medium M. The medium M is, for example, a print sheet. The medium M is not limited to the print sheet and may be, for example, a printing target made of any material such as a resin film or fabric cloth.

As illustrated in FIG. 1, the liquid ejecting apparatus 100 includes a liquid container 10, a control unit 20, a transport mechanism 30, a moving mechanism 40, and a head 50.

The liquid container 10 stores ink. Examples of the liquid container 10 are a cartridge attachable to and detachable from the liquid ejecting apparatus 100, a bag-shaped ink pack formed of a flexible film, and an ink tank with which the ink can be filled. The type of ink stored in the liquid container 10 is arbitrary. However, the viscosity of the ink is preferably in a range from 9 mPa·s to 10 mPa·s from the viewpoint of forming a suitable combined droplet using a drive signal Com described below.

The control unit 20 controls an operation of each component of the liquid ejecting apparatus 100. The control unit 20 includes one or a plurality of processing circuits such as a central processing unit (CPU) or a field programmable gate array (FPGA) and one or a plurality of storage circuits such as a semiconductor memory. A detailed configuration of the control unit 20 is described below with reference to FIG. 2.

The transport mechanism 30 transports the medium M toward the Y1 direction under control by the control unit 20. The moving mechanism 40 causes the head 50 to reciprocate along the X axis under control by the control unit 20. The moving mechanism 40 includes a box-shaped carriage 41 in which the head 50 is installed, and an endless transport belt 42 to which the carriage 41 is fixed. The number of heads 50 installed in the carriage 41 is not limited to one and may be two or more. Not only the head 50 but also the liquid container 10 may be installed in the carriage 41.

The head 50 ejects the ink supplied from the liquid container 10 onto the medium M from each of a plurality of nozzles under control by the control unit 20. Since the ejection is performed in parallel with the transport of the medium M by the transport mechanism 30 and the reciprocation of the head 50 by the moving mechanism 40, an image of the ink is formed on a surface of the medium M.

A2: Electrical Configuration of Liquid Ejecting Apparatus

Figure 2:
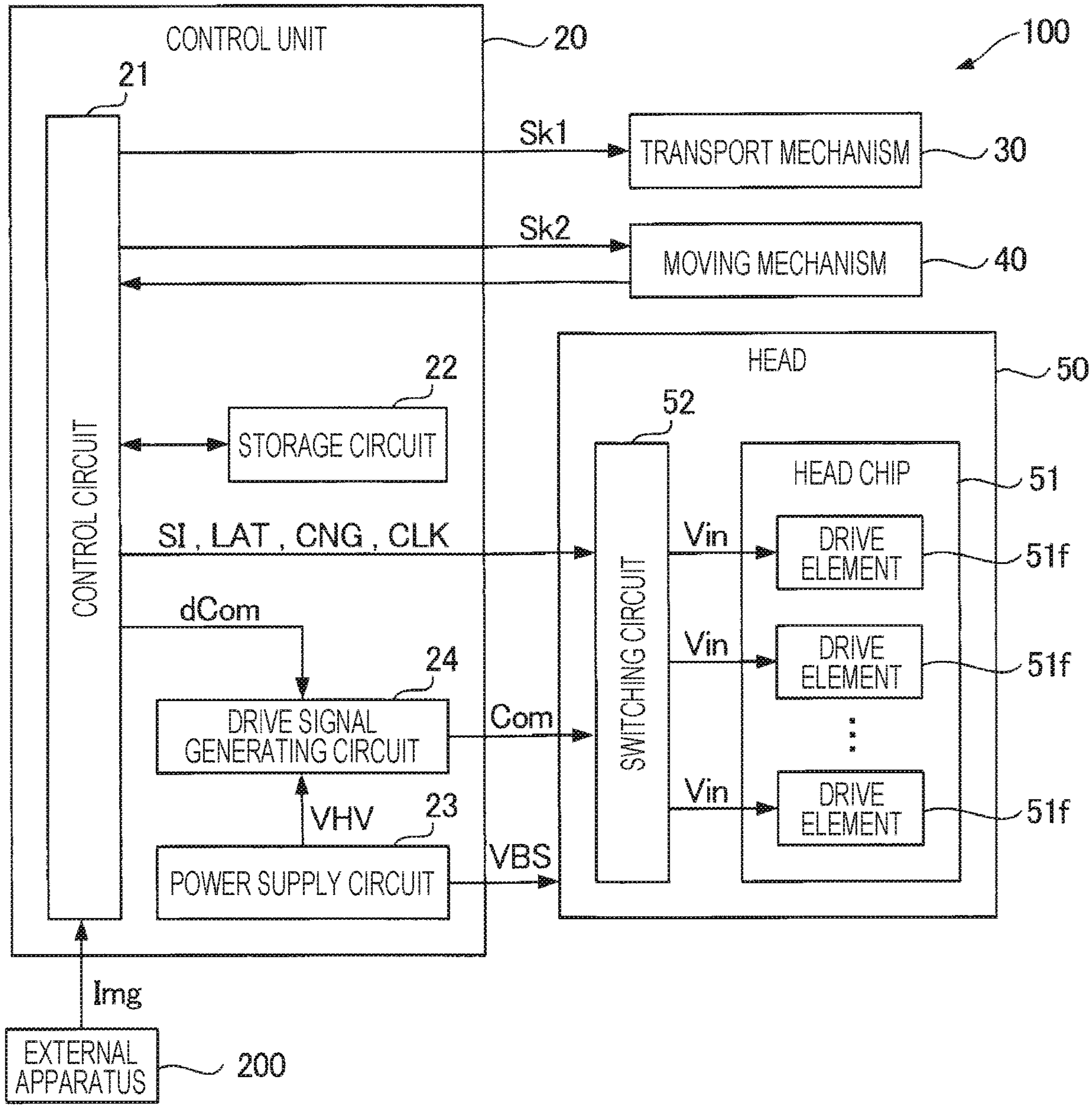
FIG. 2 is a diagram illustrating an electrical configuration of the liquid ejecting apparatus according to the first embodiment.

FIG. 2 is a diagram illustrating an electrical configuration of the liquid ejecting apparatus 100 according to the first embodiment. Although the control unit 20 is described below with reference to FIG. 2, the head 50 is briefly described before the description of the control unit 20.

As illustrated in FIG. 2, the head 50 includes a head chip 51 and a switching circuit 52.

The head chip 51 includes a plurality of drive elements **51*f* and ejects the ink from the nozzles by driving the plurality of drive elements 51*f*. Each of the drive elements 51*f* receives supply of a supply signal Vin and applies pressure to the ink. The head chip 51 is described below in detail with reference to FIGS. 3 to 5**.

The switching circuit 52 switches whether to supply, as the supply signal Vin, a drive signal Com output from the control unit 20 to each of the plurality of drive elements **51*f* included in the head chip 51 under control by the control unit 20. The switching circuit 52 is described below in detail with reference to FIG. 4**.

In the example illustrated in FIG. 2, the number of head chips 51 included in the head 50 is 1, but is not limited thereto and may be two or more. When the number of nozzles N included in the head chip 51 is M, the drive elements **51*f* may be referred to as drive elements 51*f*[m] using an index [m] to distinguish the number M of drive elements 51*f* corresponding to the number M of nozzles N. In this case, M is a natural number of 1 or greater, and m is a natural number of 1 or greater and M or less. In addition, the index [m] may be used for a number M of other components corresponding to the nozzles N or the drive elements 51*f*[m] in the liquid ejecting apparatus 100 to represent correspondence with the nozzles N or the drive elements 51*f***[m].

As illustrated in FIG. 2, the control unit 20 includes a control circuit 21, a storage circuit 22, a power supply circuit 23, and a drive signal generating circuit 24. The drive signal generating circuit 24 is an example of a "drive signal generator".

The control circuit 21 includes a function of controlling the operation of each component of the liquid ejecting apparatus 100 and a function of processing various types of data. The control circuit 21 includes, for example, a processor such as one or more central processing units (CPUs). The control circuit 21 may include a programmable logic device such as a field-programmable gate array (FPGA) instead of or in addition to the one or more CPUs. When the control circuit 21 includes a plurality of processors, the processors may be mounted on different substrates or the like.

The storage circuit 22 stores various programs to be executed by the control circuit 21 and various types of data, such as print data Img, to be processed by the control circuit 21. The storage circuit 22 includes, for example, either one or both of semiconductor memories that are a volatile memory such as a random-access memory (RAM) and a nonvolatile memory such as a read-only memory (ROM), an electrically erasable programmable read-only memory (EEPROM) or a programmable ROM (PROM). The print data Img is supplied from an external apparatus 200 such as a personal computer or a digital camera. The storage circuit 22 may be configured as a part of the control circuit 21.

The power supply circuit 23 receives supply of power from a commercial power source not illustrated and generates predetermined various potentials. The generated various potentials are appropriately supplied to each component of the liquid ejecting apparatus 100. For example, the power supply circuit 23 generates a power supply potential VHV and an offset potential VBS. The offset potential VBS is supplied to the head 50. The power supply potential VHV is supplied to the drive signal generating circuit 24.

The drive signal generating circuit 24 generates the drive signal Com for driving each of the drive elements **51*f*. Specifically, the drive signal generating circuit 24 includes a digital-to-analog (DA) conversion circuit and an amplifying circuit. In the drive signal generating circuit 24, the DA conversion circuit converts a waveform specifying signal dCom from the control circuit 21 from a digital signal to an analog signal, and the amplifying circuit amplifies the analog signal using the power supply potential VHV from the power supply circuit 23 to generate the drive signal Com. A signal having a waveform to be supplied to the drive elements 51***f* and included in a waveform included in the drive signal Com is the supply signal Vin described above. The waveform specifying signal dCom is a digital signal for defining the waveform of the drive signal Com.

The control circuit 21 controls the operation of each component of the liquid ejecting apparatus 100 by executing a program stored in the storage circuit 22. The control circuit 21 executes the program to generate control signals Sk1 and Sk2, a print data signal SI, the waveform specifying signal dCom, a latch signal LAT, a change signal CNG, and a clock signal CLK as signals for controlling the operation of each component of the liquid ejecting apparatus 100.

The control signal Sk1 is a signal for controlling driving of the transport mechanism 30. The control signal Sk2 is a signal for controlling driving of the moving mechanism 40. The print data signal SI is a digital signal for specifying operational states of the drive elements 51*f*. The latch signal LAT and the change signal CNG are timing signals that are used with the print data signal SI and define a timing of ejecting the ink from each of the nozzles N of the head chip 51. The timing signals are generated based on output of an encoder that detects the position of the carriage 41 described above.

A4: Specific Structure of Head Chip

Figure 3:
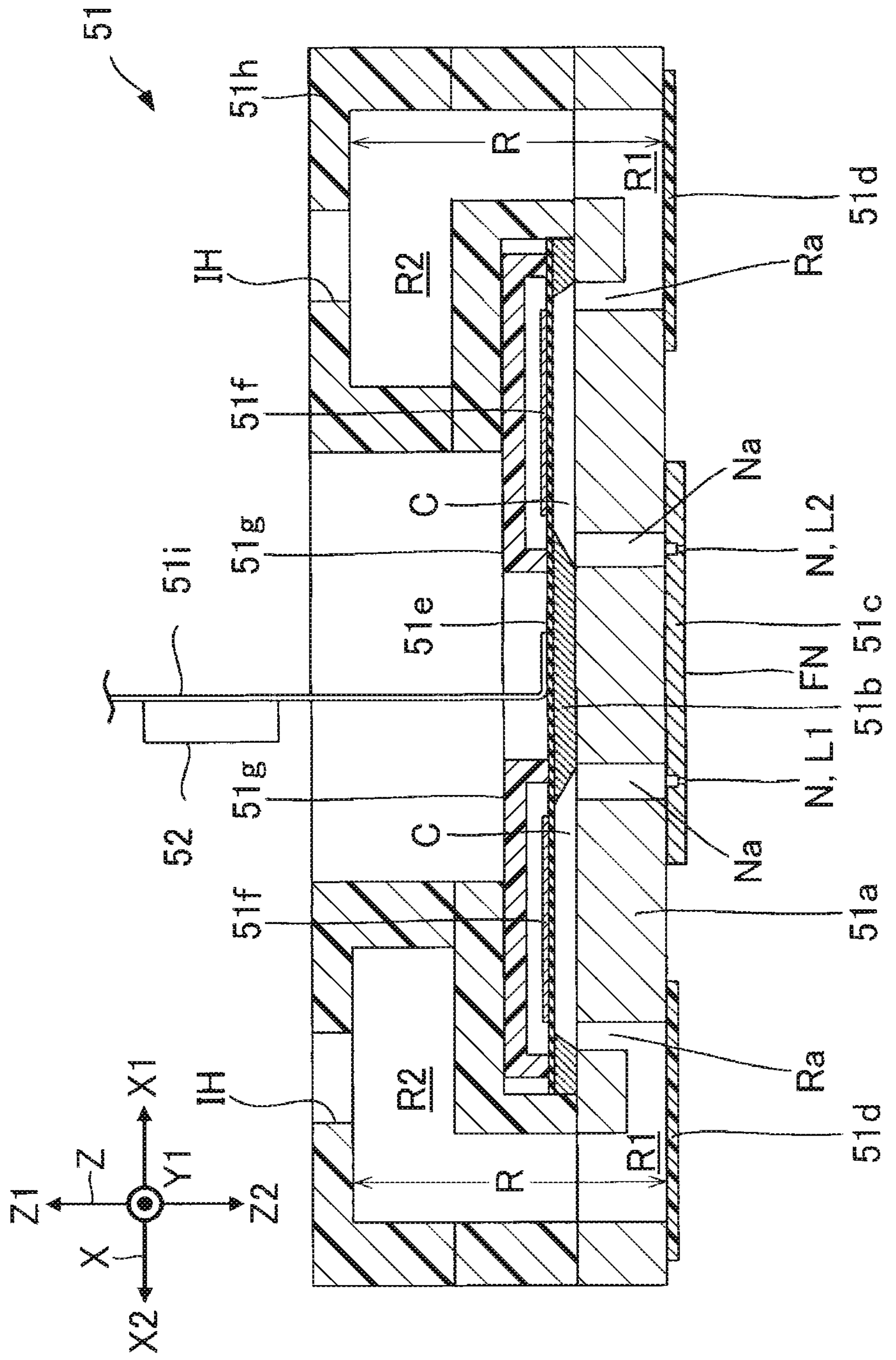
FIG. 3 is a cross-sectional view illustrating an example of a head chip.

FIG. 3 is a cross-sectional view illustrating an example of the head chip 51. As illustrated in FIG. 3, the head chip 51 includes the plurality of nozzles N arrayed in the direction along the Y axis. The plurality of nozzles N are sectioned into a first row L1 and a second row L2 that are spaced apart from each other in the direction along the X axis. Each of the first row L1 and the second row L2 is a set of a plurality of nozzles N linearly arrayed in the direction along the Y axis.

The head chip 51 has a configuration substantially symmetrical about the direction along the X axis. However, the positions of the plurality of nozzles N of the first row L1 may match the positions of the plurality of nozzles N of the second row L2 in the direction along the Y axis or may be different from the positions of the plurality of nozzles N of the second row L2 in the direction along the Y axis. FIG. 3 illustrates a configuration in which the positions of the plurality of nozzles N of the first row L1 match the positions of the plurality of nozzles N of the second row L2 in the direction along the Y axis.

As illustrated in FIG. 3, the head chip 51 includes a flow path substrate 51*a*, a pressure chamber substrate 51*b*, a nozzle plate 51*c*, a vibration absorber 51*d*, a vibration plate 51*e*, the plurality of drive elements 51*f*, a protective plate 51*g*, a casing 51*h*, and a wiring substrate 51*i*.

The flow path substrate 51*a* and the pressure chamber substrate 51*b* are stacked in the Z1 direction in this order and form a flow path for supplying the ink to the plurality of nozzles N. The vibration plate 51*e*, the plurality of drive elements 51*f*, the protective plate 51*g*, the casing 51*h*, and the wiring substrate 51*i* are disposed in a region located in the Z1 direction with respect to a stacked body of the flow path 51*a* and the pressure chamber substrate 51*b*. Meanwhile, the nozzle plate 51*c* and the vibration absorber 51*d* are disposed in a region located in the Z2 direction with respect to the stacked body. The members 51*a* to 51*i* of the head chip 51 are substantially plate-shaped members substantially elongated in the Y direction and are bonded to each other by, for example, an adhesive. The members 51*a* to 51*i* of the head chip 51 are described below.

The nozzle plate 51*c* is a plate-shaped member in which the plurality of nozzles N of each of the first row L1 and the second row L2 are disposed. Each of the plurality of nozzles N is a through-hole through which the ink passes. A surface of the nozzle plate 51*c* facing toward the Z2 direction is a nozzle surface FN. The nozzle plate 51*c* is formed, for example, by processing a silicon single-crystal substrate by a semiconductor manufacturing technique using a processing technique such as dry etching or wet etching. However, in the formation of the nozzle plate 51*c*, another known method and another known material may be appropriately used. In addition, a cross-sectional shape of each of the nozzles N is typically a circular shape, but is not limited thereto and may be a non-circular shape such as a polygonal shape or an elliptical shape.

In the flow path substrate 51*a*, a space R1, a plurality of supply flow paths Ra, and a plurality of communication flow paths Na are disposed for each of the first row L1 and the second row L2. The spaces R1 are openings elongated in the direction along the Y axis as viewed in a plan view in the direction along the Z axis. Each of the supply flow paths Ra and each of the communication flow paths Na are through-holes formed for a respective one of the nozzles N. Each of the supply flow paths Ra communicate with a corresponding one of the spaces R1.

The pressure chamber substrate 51*b* is a plate-shaped member in which a plurality of pressure chambers C that are referred to as cavities are disposed for each of the first row L1 and the second row L2. The plurality of pressure chambers C are arrayed in the direction along the Y axis. Each of the pressure chambers C is formed for a respective one of the nozzles N. The pressure chambers C are spaces elongated in the direction along the X axis in a plan view. Each of the flow path substrate 51*a* and the pressure chamber substrate 51*b* is formed, for example, by processing a silicon single-crystal substrate by a semiconductor manufacturing technique in a similar manner to the formation of the nozzle plate 51*c* described above. However, in the formation of the flow path substrate 51*a* and the pressure chamber substrate 51*b*, another known method and another known material may be appropriately used.

The pressure chambers C are spaces located between the flow path substrate 51*a* and the vibration plate 51*e*. The plurality of pressure chambers C are arrayed in the direction along the Y axis for each of the first row L1 and the second row L2. In addition, the pressure chambers C communicate with the respective communication flow paths Na and the respective supply flow paths Ra. Therefore, the pressure chambers C communicate with the nozzles N via the communication flow paths Na and communicate with the spaces R1 via the supply flow paths Ra.

The vibration plate 51*e* is disposed on a surface of the pressure chamber substrate 51*b* facing toward the Z1 direction. The vibration plate 51*e* is a plate-shaped member that can elastically vibrate. The vibration plate 51*e* includes, for example, a first layer and a second layer that are stacked in the Z1 direction in this order. The first layer is, for example, an elastic film made of silicon oxide ($SiO_2$). The elastic film is, for example, formed by thermally oxidizing one surface of a silicon single-crystal substrate. The second layer is, for example, an insulating film made of zirconium oxide ($ZrO_2$). The insulating film is, for example, formed by forming a layer of zirconium by sputtering and thermally oxidizing the layer. The vibration plate 51*e* is not limited to the configuration with the stacked first and second layers described above and may include only a single layer or may include three or more layers.

The plurality of drive elements 51*f* corresponding to the nozzles N in each of the first row L1 and the second row L2 are disposed on a surface of the vibration plate 51*e* facing toward the Z1 direction. Each of the drive elements 51*f* is a passive element that is deformed by supply of the drive signal. The drive elements 51*f* are elongated in the direction along the X axis in a plan view. The plurality of drive elements 51*f* are arrayed in the direction along the Y axis in such a way that the plurality of drive elements 51*f* correspond to the plurality of pressure chambers C. The drive elements 51*f* overlap the pressure chambers C in a plan view.

Each of the drive elements 51*f* is a piezoelectric element and includes a first electrode, a piezoelectric layer, and a second electrode that are stacked in the Z1 direction in this order, although not illustrated. The first electrodes or the second electrodes are individual electrodes spaced apart from each other for each of the drive elements 51*f*, and the supply signal Vin is supplied to the individual electrodes. The other electrodes that are not the individual electrodes and are the first electrodes or the second electrodes are a strip-shaped common electrode extending in the direction along the Y axis and continuous over the plurality of drive elements 51*f*. The offset potential VBS is supplied to the other electrodes. Examples of a metal material of the electrodes are platinum (Pt), aluminum (Al), nickel (Ni), gold (Au), and copper (Cu). Among these materials, one type can be used alone or two or more types can be used in combination in the form of an alloy, a stacked layer, or the like. The piezoelectric layers are made of a piezoelectric material such as lead zirconate titanate ($Pb(Zr, Ti)O_3$). For example, the piezoelectric layers are a strip-shaped layer extending in the direction along the Y axis and continuous over the plurality of drive elements 51*f*. However, the piezoelectric layers may be integrated over the plurality of drive elements 51*f*. In this case, through-holes penetrating through the piezoelectric layers extend in the direction along the X axis in regions corresponding to gaps between the pressure chambers C adjacent to each other in a plan view. When the vibration plate 51*e* vibrates in coordination with the deformation of the drive elements 51*f*, pressure in the pressure chambers C changes and the ink is ejected from the nozzles N.

The protective plate 51*g* is a plate-shaped member disposed on the surface of the vibration plate 51*e* facing toward the Z1 direction. The protective plate 51*g* protects the plurality of drive elements 51*f* and reinforces the mechanical strength of the vibration plate 51*e*. The plurality of drive elements 51*f* are housed between the protective plate 51*g* and the vibration plate 51*e*. The protective plate 51*g* is made of a resin material, for example.

The casing 51*h* is a member for storing the ink to be supplied to the plurality of pressure chambers C. The casing 51*h* is made of a resin material, for example. In the casing 51*h*, a space R2 is provided for each of the first row L1 and the second row L2. The spaces R2 are spaces communicating with the spaces R1 described above and function as reservoirs R for storing the ink to be supplied to the plurality of pressure chambers C together with the spaces R1. In the casing 51*h*, an introduction inlet IH for supplying the ink to each of the reservoirs R is disposed. The ink in each of the reservoirs R is supplied to the pressure chambers C through each of the supply flow paths Ra.

The vibration absorber 51*d* is also referred to as a compliance substrate and is a flexible resin film forming wall surfaces of the reservoirs R. The vibration absorber 51*d* reduces a change in the pressure of the ink in each of the reservoirs R. The vibration absorber 51*d* may be a flexible thin metal plate. A surface of the vibration absorber 51*d* facing toward the Z1 direction is bonded to the flow path substrate 51*a* by an adhesive or the like.

The wiring substrate 51*i* is mounted on the surface of the vibration plate 51*e* facing toward the Z1 direction. The wiring substrate 51*i* is a mounting component for electrically coupling the head chip 51 to the control unit 20. The wiring substrate 51*i* is, for example, a flexible wiring substrate such as a chip on film (COF), a flexible printed circuit (FPC), or a flexible flat cable (FFC). The switching circuit 52 for supplying a drive voltage to each of the drive elements 51*f* is mounted on the wiring substrate 51*i* according to the present embodiment.

A6: Driving of Drive Elements 51*f*

Figure 4:
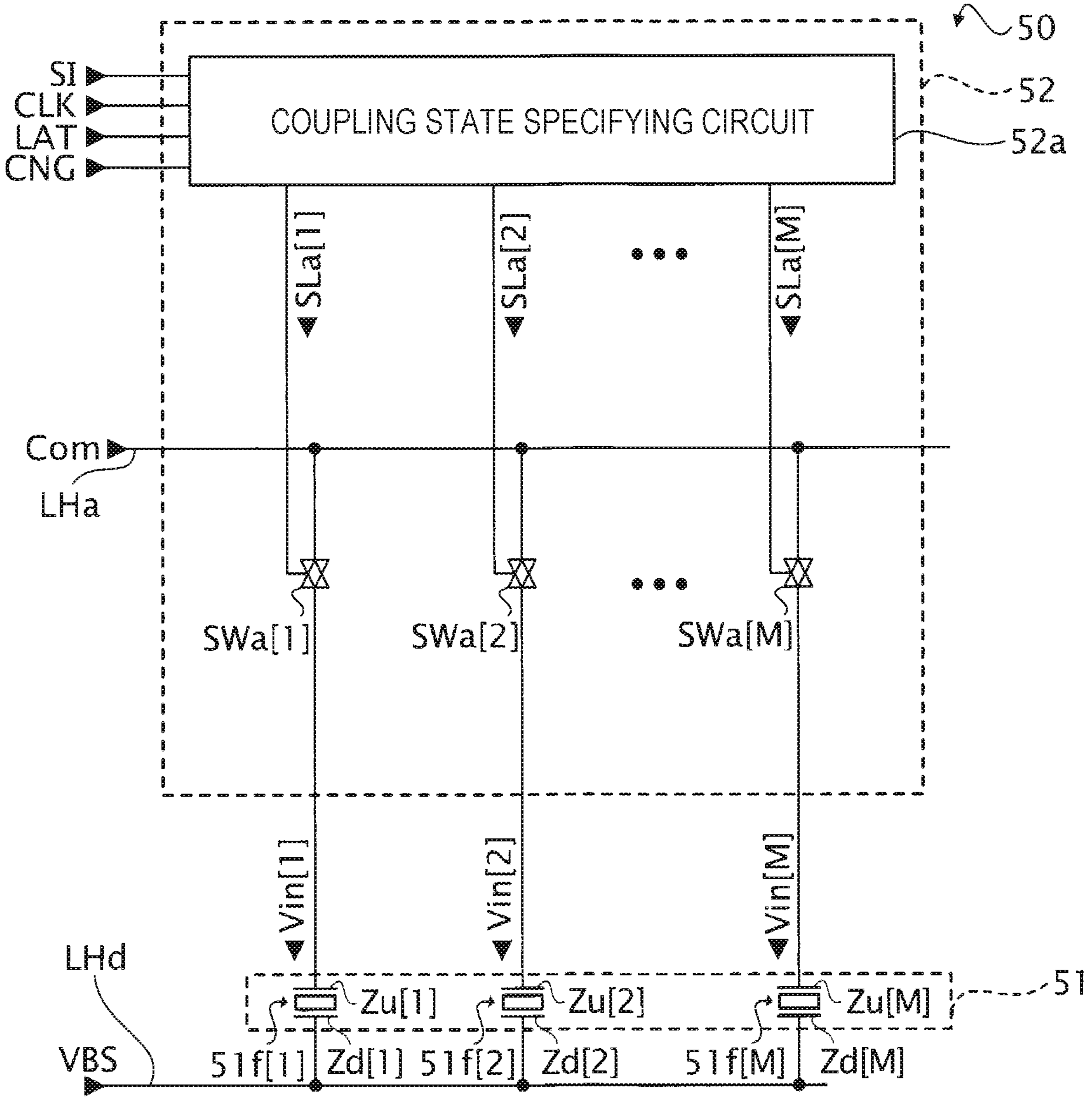
FIG. 4 is a diagram illustrating a switching circuit.

FIG. 4 is a diagram illustrating the switching circuit 52. The drive elements 51*f* are driven by the supply signal Vin from the switching circuit 52. The switching circuit 52 is described below with reference to FIG. 4.

As illustrated in FIG. 4, a wiring LHa is coupled to the switching circuit 52. The wiring LHa is a signal line through which the drive signal Com is transferred. In FIG. 4, one of the first and second electrodes of each of the drive elements 51*f* described above is illustrated as an electrode Zd[m], and the other of the first and second electrodes of each of the drive elements 51*f* is illustrated as an electrode Zu[m]. A wiring LHd is coupled to the electrodes Zd[m]. The wiring LHd is a feed line through which the offset potential VBS is supplied.

The switching circuit 52 includes a number M of switches SWa (SWa[1] to SWa[M]) and a coupling state specifying circuit 52*a* that specifies coupling states of the switches SWa.

The switches SWa[m] switch between a conductive (ON) state and a non-conductive (OFF) state between the wiring LHa for transfer of the drive signal Com and the electrodes Zu[m] of the drive elements 51*f*[m]. Each of the switches SWa[m] is, for example, a transmission gate.

The coupling state specifying circuit 52*a* generates coupling state specifying signals SLa[1] to SLa[M] specifying turning on and off of the switches SWa[1] to SWa[M] based on the clock signal CLK, the print data signal SI, the latch signal LAT, and the change signal CNG supplied from the control circuit 21.

For example, although not illustrated, the coupling state specifying circuit 52*a* includes a plurality of transfer circuits, a plurality of latch circuits, and a plurality of decoders. The plurality of transfer circuits, the plurality of latch circuits, and the plurality of decoders have one-to-one correspondence with the drive elements 51*f*[1] to 51*f*[*M*]. The print data signal SI is supplied to the transfer circuits among the circuits and the decoders. The print data signal SI includes individual specifying signals for the drive elements 51*f*. The individual specifying signals are serially supplied and are, for example, sequentially transferred to the transfer circuits in synchronization with the clock signal CLK. The latch circuits latch, based on the latch signal LAT, the individual specifying signals supplied to the transfer circuits. The decoders generate the coupling state specifying signals SLa[m] based on the individual specifying signals, the latch signal LAT, and the change signal CNG.

The switches SWa[m] are turned on and off according to the coupling state specifying signals SLa[m] generated in the above-described manner. For example, when the coupling state specifying signals SLa[m] are at a high level, the switches SWa[m] are turned on. When the coupling state specifying signals SLa[m] are at a low level, the switches SWa[m] are turned off. The switching circuit 52 supplies, as the supply signal Vin, a part of the waveform included in the drive signal Com or the entire waveform included in the drive signal Com to one or more drive elements 51*f* selected from among the plurality of drive elements 51*f*.

A7: Drive Signal

Figure 5:
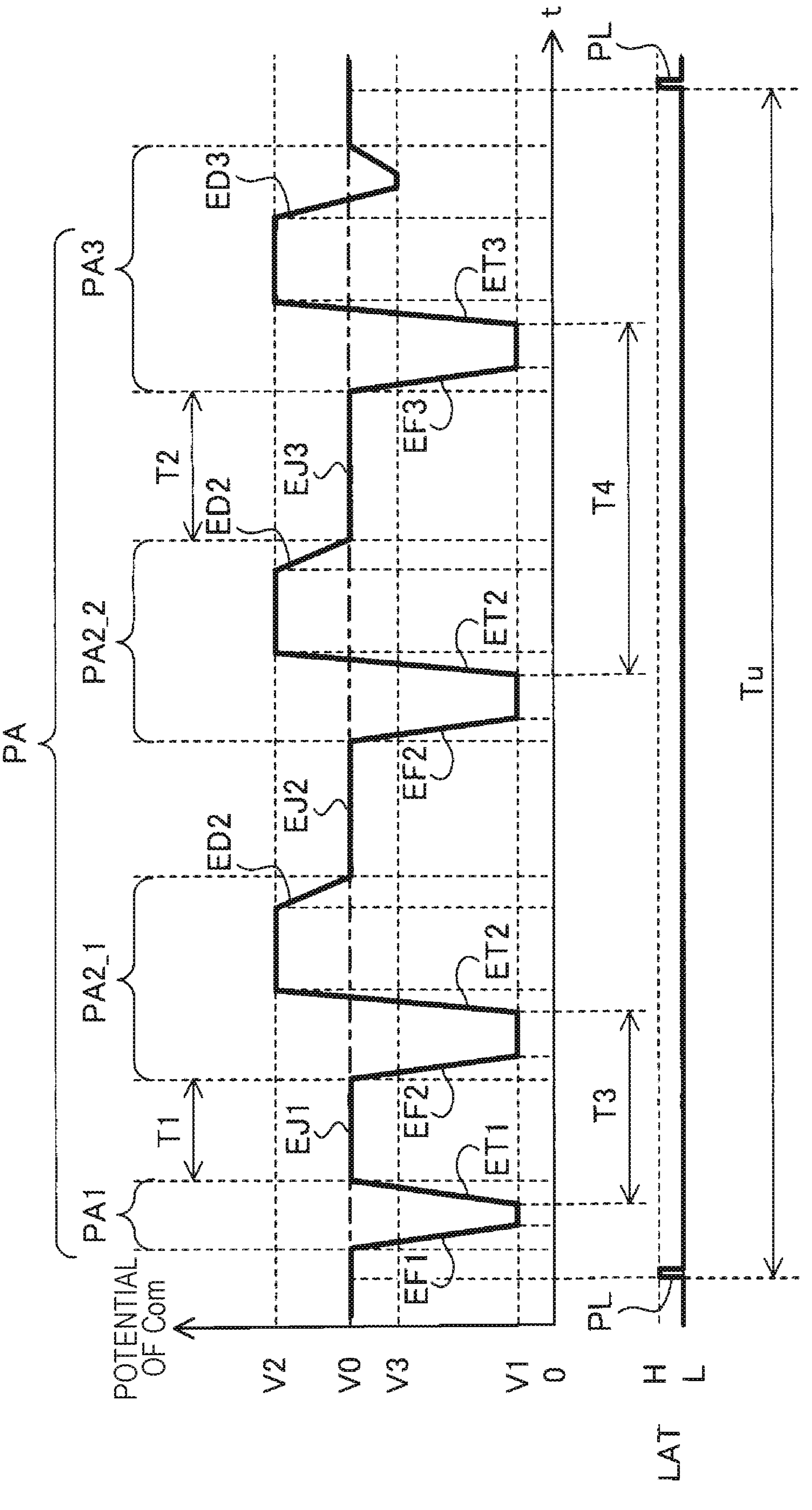
FIG. 5 is a diagram illustrating a drive signal used in the first embodiment.

FIG. 5 is a diagram illustrating the drive signal Com used in the first embodiment. As illustrated in FIG. 5, the latch signal LAT includes pulses PL for defining a unit time Tu. The unit time Tu corresponds to a printing period in which ink dots are formed on the medium M from the nozzles N. For example, the unit time Tu is defined as a period from a rising edge of the pulse PL to a rising edge of the next pulse PL. A specific length or period of the unit time Tu is not particularly limited.

The drive signal Com used in the present embodiment includes a first ejection pulse PA1, an interpulse component EJ1, a second ejection pulse PA2_1, an interpulse component EJ2, a second ejection pulse PA2_2, an interpulse component EJ3, and a third ejection pulse PA3 in this order in the unit time Tu.

Each of the first ejection pulse PA1, the second ejection pulse PA2_1, the second ejection pulse PA2_2, and the third ejection pulse PA3 may be hereinafter referred to as an ejection pulse PA. Each of the second ejection pulse PA2_1 and the second ejection pulse PA2_2 may be hereinafter referred to as a second ejection pulse PA2. Each of the interpulse components EJ1, EJ2, and EJ3 may be hereinafter referred to as an interpulse component EJ.

The first ejection pulse PA1, the second ejection pulse PA2_1, the second ejection pulse PA2_2, and the third ejection pulse PA3 are a plurality of ejection pulses PA for sequentially ejecting, from each of the nozzles N, a plurality of droplets that are to be combined after being ejected from the nozzles and before landing on the medium M. The first ejection pulse PA1, the second ejection pulse PA2_1, the second ejection pulse PA2_2, and the third ejection pulse PA3 are temporally aligned corresponding to the plurality of droplets. Each of the interpulse components EJ1, EJ2, and EJ3 is between two temporally continuous ejection pulses PA among the plurality of ejection pulses PA and is maintained at a reference potential V0. The reference potential V0 is higher than a zero potential and is, for example, higher than the offset potential VBS.

The ejection pulses PA are potential pulses for driving the drive elements 51*f* to change the pressure in the pressure chambers C to a pressure level that causes the ink to be ejected from the nozzles N. The ink is ejected as droplets from the nozzles N by the supply of the ejection pulses PA to the drive elements 51*f*.

Specifically, the first ejection pulse PA1 is the earliest ejection pulse PA among the plurality of ejection pulses PA in the unit time Tu. In the example illustrated in FIG. 5, the first ejection pulse PA1 includes a filling component EF1 and an ejection component ET1 in this order. In the present embodiment, the filling component EF1 is temporally continuous with the ejection component ET1 via a fixed-potential component maintained at a first potential V1. The filling component EF1 changes from the reference potential V0 to the first potential V1. The first potential V1 is lower than the reference potential V0. The ejection component ET1 changes from the first potential V1 to the reference potential V0 and is temporally continuous with the interpulse component EJ1. Therefore, it is possible to reduce the time length of the first ejection pulse PA1.

The first ejection pulse PA1 is a potential pulse having a waveform with a potential that changes from the reference potential V0 to the first potential V1 and returns to the reference potential V0. Upon receiving supply of the first ejection pulse PA1, the drive elements 51*f* cause the pressure in the pressure chambers C to be negative based on the filling component EF1 and cause the pressure in the pressure chambers C to be positive based on the ejection component ET1 in such a way that droplets are ejected from the nozzles N.

The first ejection pulse PA1 is temporally continuous with the second ejection pulse PA2_1 via the interpulse component EJ1. In the example illustrated in FIG. 5, the end point of the ejection component ET1 of the first ejection pulse PA1 is temporally continuous with the start point of the interpulse component EJ1.

The second ejection pulses PA2_1 and PA2_2 are a plurality of ejection pulses PA succeeding the first ejection pulse PA1 among the plurality of ejection pulses PA in the unit time Tu. In the example illustrated in FIG. 5, each of the second ejection pulses PA2 includes a filling component EF2, an ejection component ET2, and a first vibration suppression component ED2 in this order. In the present embodiment, in each of the second ejection pulses PA2, the filling component EF2 is temporally continuous with the ejection component ET2 via a fixed-potential component maintained at the first potential V1, and the ejection component ET2 is temporally continuous with the first vibration suppression component ED2 via a fixed-potential component maintained at a second potential V2. The filling component EF2 changes from the reference potential V0 to the first potential V1. The ejection component ET2 changes from the first potential V1 to the second potential V2. The end point of the interpulse component EJ1 is temporally continuous with the start point of the filling component EF2 of the second ejection pulse PA2_1. The second potential V2 is higher than the reference potential V0. Therefore, the reference potential V0 is a potential between the first potential V1 and the second potential V2. The first vibration suppression component ED2 changes from the second potential V2 to the reference potential V0.

The interpulse component EJ2 is between the second ejection pulse PA2_1 and the second ejection pulse PA2_2. In the example illustrated in FIG. 5, the end point of the first vibration suppression component ED2 of the second ejection pulse PA2_1 is temporally continuous with the start point of the interpulse component EJ2. The end point of the interpulse component EJ2 is temporally continuous with the start point of the filling component EF2 of the second ejection pulse PA2_2.

From the viewpoint of the simplification of the design of the drive signal Com, it is preferable that the second ejection pulses PA2_1 and PA2_2 be in the same shape.

Each of the second ejection pulses PA2 is a potential pulse having a waveform with a potential that changes from the reference potential V0 to the first potential V1 and the second potential V2 and returns to the reference potential V0. Upon receiving supply of each of the second ejection pulses PA2, the drive elements 51*f* cause the pressure in the pressure chambers C to be negative based on the filling component EF2 and cause the pressure in the pressure chambers C to be positive based on the ejection component ET2 in such a way that droplets are ejected from the nozzles N, and dampen residual vibration in the pressure chambers C based on the first vibration suppression component ED2 after the ejection component ET2.

In this case, the change in the potential of the ejection component ET2 of each of the second ejection pulses PA2, that is, the difference between the first potential V1 and the second potential V2 is larger than the change in the potential of the ejection component ET1 of the first ejection pulse PA1, that is, the difference between the first potential V1 and the reference potential V0.
Therefore, a speed at which a droplet is ejected according to each of the second ejection pulses PA2 can be set to be higher than a speed at which a droplet is ejected according to the first ejection pulse PA1.

In addition, since residual vibration in the pressure chambers C is appropriately dampened according to the first vibration suppression components ED2 after the ejection components ET2, it is not necessary to wait for the residual vibration to be attenuated to the extent that the residual vibration does not adversely affect subsequent ejection, and it is possible to shorten the time lengths of the interpulse components EJ between the second ejection pulses PA2 and the ejection pulses PA succeeding the second ejection pulses PA2. That is, it is possible to shorten the time length of the interpulse component EJ2 between the second ejection pulse PA2_1 and the second ejection pulse PA2_2 and shorten the time length of the interpulse component EJ3 between the second ejection pulse PA2_2 and the third ejection pulse PA3.

When a period of natural vibration in the pressure chambers C is TC, a length of a period from the end point of the ejection component ET1 of the first ejection pulse PA1 to the start point of the filling component EF2 of the earliest second ejection pulse PA2_1 among the plurality of second ejection pulses PA2, that is, the time length T1 of the interpulse component EJ1 is preferably in a range from 0.8 TC to 0.9 TC. When the time length T1 is in the range from 0.8 TC to 0.9 TC, the time length T1 of the interpulse component EJ1 can be shortened in such a way that a droplet is suitably ejected according to the second ejection pulse PA2_1.

When the time length T1 is too short, the amount of a droplet ejected according to the second ejection pulse PA2_1 tends to decrease and the ejection tends to be unstable, depending on the viscosity of the ink, the characteristics of the head 50, or the like. When the time length T1 is too long, it is difficult to combine droplets ejected according to the second ejection pulse PA2_1 and the ejection pulses PA after the second ejection pulse PA2_1 with a droplet ejected according to the first ejection pulse PA1, depending on the viscosity of the ink, the characteristics of the head 50, or the like.

A time length T3 of a period from the start point of the ejection component ET1 of the first ejection pulse PA1 to the start point of the ejection component of the earliest second ejection pulse PA2_1 among the plurality of second ejection pulses PA2 is preferably in a range from 1.3 TC to 1.7 TC. When the time length T3 is in the range from 1.3 TC to 1.7 TC, the time length T3 can be shortened in such a way that a droplet is suitably ejected according to the second ejection pulse PA2_1.

When the time length T3 is too short, the amount of a droplet ejected according to the second ejection pulse PA2_1 tends to decrease and the ejection tends to be unstable, depending on the viscosity of the ink, the characteristics of the head 50, or the like. When the time length T3 is too long, it is difficult to combine droplets ejected according to the second ejection pulse PA2_1 and the ejection pulses PA after the second ejection pulse PA2_1 with a droplet ejected according to the first ejection pulse PA1, depending on the viscosity of the ink, the characteristics of the head 50, or the like.

The second ejection pulse PA2_2 described above is temporally continuous with the third ejection pulse PA3 via the interpulse component EJ3. In the example illustrated in FIG. 5, the end point of the first vibration suppression component ED2 of the second ejection pulse PA2_2 is temporally continuous with the start point of the interpulse component EJ3.

The third ejection pulse PA3 is the latest ejection pulse PA among the plurality of ejection pulses PA in the unit time Tu. In the example illustrated in FIG. 5, the third ejection pulse PA3 includes a filling component EF3, an ejection component ET3, and a second vibration suppression component ED3 in this order. In the present embodiment, the filling component EF3 is temporally continuous with the ejection component ET3 via a fixed-potential component maintained at the first potential V1, and the ejection component ET3 is temporally continuous with the second vibration suppression component ED3 via a fixed-potential component maintained at the second potential V2. The filling component EF3 changes from the reference potential V0 to the first potential V1. The end point of the interpulse component EJ3 is temporally continuous with the start point of the filling component EF3. The ejection component ET3 changes from the first potential V1 to the second potential V2. The second vibration suppression component ED3 changes from the second potential V2 to a third potential V3. The third potential V3 is lower than the reference potential V0. Therefore, the reference potential V0 is a potential between the second potential V2 and the third potential V3. The third ejection pulse PA3 includes a fixed-potential component maintained at the third potential V3 and a potential change component in this order after the second vibration suppression component ED3. The potential change component changes from the third potential V3 to the reference potential V0.

As described above, the third ejection pulse PA3 is a potential pulse having a waveform with a potential that changes from the reference potential V0 to the first potential V1, the second potential V2, and the third potential V3 and returns to the reference potential V0. Upon receiving supply of the third ejection pulse PA3, the drive elements 51*f* cause the pressure in the pressure chambers C to be negative based on the filling component EF3 and cause the pressure in the pressure chambers C to be positive based on the ejection component ET3 in such a way that droplets are ejected from the nozzles N, and dampen residual vibration in the pressure chambers C based on the second vibration suppression component ED3 after the ejection component ET3.

In this case, the change in the potential of the ejection component ET3 of the third ejection pulse PA3, that is, the difference between the first potential V1 and the second potential V2 is larger than the change in the potential of the ejection component ET1 of the first ejection pulse PA1, that is, the difference between the first potential V1 and the reference potential V0.
Therefore, a speed at which a droplet is ejected according to the third ejection pulse PA3 can be higher than the speed at which the droplet is ejected according to the first ejection pulse PA1.

The shape of the ejection component ET3 of the third ejection pulse PA3 is the same as the shape of the ejection component ET2 of each of the second ejection pulses PA2. In the present embodiment, the ejection components ET of the ejection pulses other than the first ejection pulse PA1 among the plurality of ejection pulses PA are in the same shape. Therefore, the drive signal Com is easily designed, as compared with a case where all waveforms of a plurality of ejection pulses PA are different from each other.

The change in the potential of the second vibration suppression component ED3 of the third ejection pulse PA3, that is, the difference between the second potential V2 and the third potential V3 is larger than the change in the potential of the first vibration suppression component ED2 of each of the second ejection pulses PA2, that is, the difference between the second potential V2 and the reference potential V0. Therefore, residual vibration in the pressure chambers C is suitably dampened, as compared with the first vibration suppression component ED2. As a result, the residual vibration in the pressure chambers C is sufficiently dampened according to the second vibration suppression component ED3 after the ejection component ET3 of the latest third ejection pulse PA3 among the plurality of ejection pulses PA, and thus the effect of the residual vibration on the next unit time Tu can be reduced without setting a long interpulse period for sufficiently attenuating the residual vibration after the third ejection pulse PA3. Therefore, it is possible to suppress a reduction in the printing quality due to a change in the amount of droplets ejected and a change in the ejection speed in a succeeding unit time Tu, depending on whether droplets are ejected in a preceding unit time Tu out of the two continuous unit times Tu. In addition, it is not necessary to set a long interpulse period for sufficiently attenuating residual vibration after the third ejection pulse PA3 and it is possible to shorten the unit time Tu and increase the printing speed.

A time length T2 of a period from the end point of the first vibration suppression component ED2 of the second ejection pulse PA2_2 immediately preceding the third ejection pulse PA3 to the start point of the filling component EF3 of the third ejection pulse PA3 is preferably in a range from 1.1 TC to 1.4 TC. When the time length T2 is in the range from 1.1 TC to 1.4 TC, the time length T2 can be shortened in such a way that a droplet is suitably ejected according to the third ejection pulse PA3. In the present embodiment, the time length T2 is equal to the time length of the interpulse component EJ3.

When the time length T2 is too short, the amount of a droplet ejected according to the third ejection pulse PA3 tends to decrease and the ejection tends to be unstable, depending on the viscosity of the ink, the characteristics of the head 50, or the like. When the time length T2 is too long, it is difficult to combine a droplet ejected according to the third ejection pulse PA3 with droplets ejected according to the second ejection pulse PA2_2 and the ejection pulses PA before the second ejection pulse PA2_2, depending on the viscosity of the ink, the characteristics of the head 50, or the like.

A time length T4 of a period from the start point of the ejection component ET2 of the second ejection pulse PA2_2 immediately preceding the third ejection pulse PA3 to the start point of the ejection component ET3 of the third ejection pulse PA3 is preferably in a range from 2.7 TC to 3.1 TC. In this case, since the time length T4 is in the range from 2.7 TC to 3.1 TC, the time length T4 can be shortened in such a way that a droplet is suitably ejected according to the third ejection pulse PA3.

When the time length T4 is too short, the amount of a droplet ejected according to the third ejection pulse PA3 tends to decrease and the ejection tends to be unstable, depending on the viscosity of the ink, the characteristics of the head 50, or the like. When the time length T4 is too long, it is difficult to combine a droplet ejected according to the third ejection pulse PA3 with droplets ejected according to the second ejection pulse PA2_2 and the ejection pulses PA before the second ejection pulse PA2_2, depending on the viscosity of the ink, the characteristics of the head 50, or the like.

When the drive signal Com described above is supplied to the drive elements 51*f*, a plurality of droplets corresponding to the first ejection pulse PA1, the second ejection pulse PA2_1, the second ejection pulse PA2_2, and the third ejection pulse PA3 are sequentially ejected from each of the nozzles N.

A plurality of droplets DR ejected from each of the nozzles N when the drive signal Com is supplied to the drive elements 51*f* are described below. Each of the filling components EF1, EF2, and EF3 may be hereinafter referred to as a filling component EF. Each of the ejection components ET1, ET2, and ET3 may be hereinafter referred to as an ejection component ET.

Figure 6:
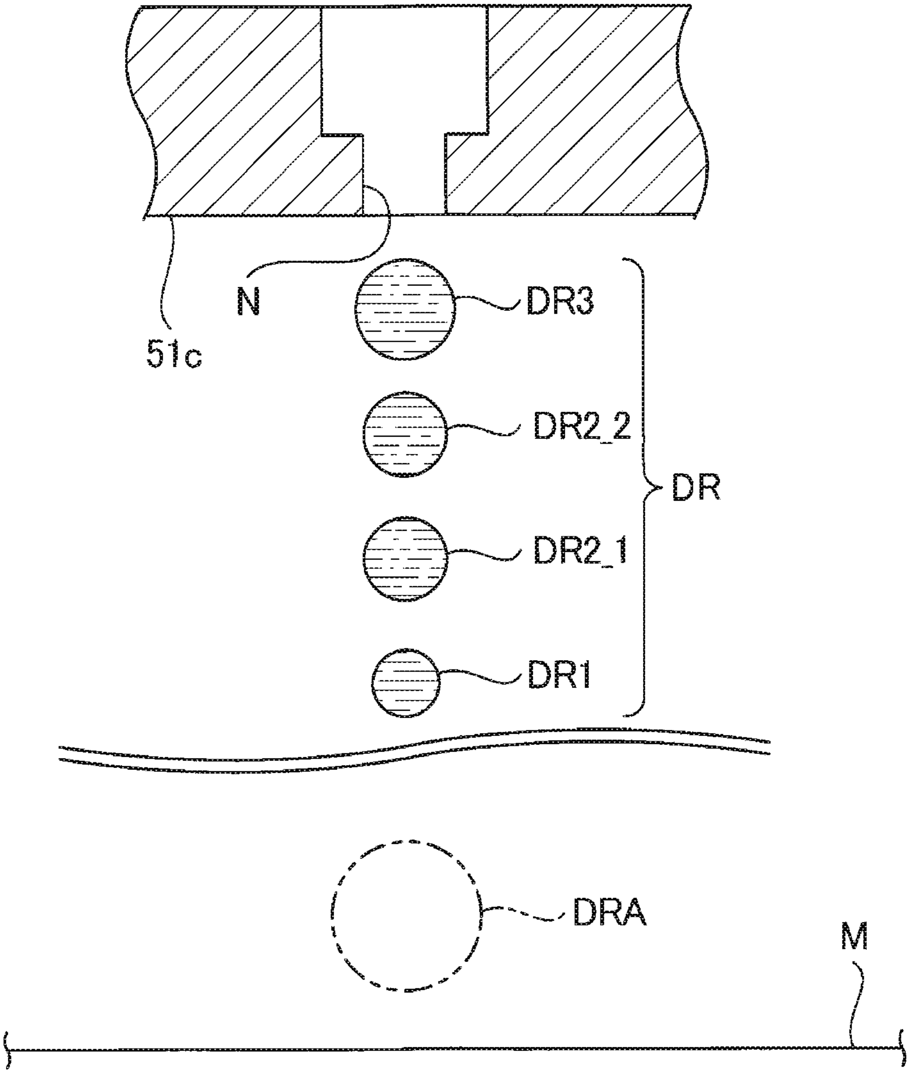
FIG. 6 is a diagram illustrating a combined droplet obtained by combining a plurality of droplets sequentially ejected from a nozzle.

FIG. 6 is a diagram illustrating a combined droplet DRA obtained by combining a plurality of droplets DR sequentially ejected from a nozzle N. In FIG. 6, as the plurality of droplets DR, a droplet DR1 corresponding to the first ejection pulse PA1, a droplet DR2_1 corresponding to the second ejection pulse PA2_1, a droplet DR2_2 corresponding to the second ejection pulse PA2_2, and a droplet DR3 corresponding to the third ejection pulse PA3 are represented by solid lines. In FIG. 6, the combined droplet DRA obtained by combining the droplet DR1, the droplet DR2_1, the droplet DR2_2, and the droplet DR3 is represented by a dashed-and-double-dotted line. The positions, sizes, shapes, and the like of the droplets DR1, DR2_1, DR2_2, and DR3 and the combined droplet DRA are not limited to the example illustrated in FIG. 6.

When the drive signal Com illustrated in FIG. 5 is supplied to the drive element 51*f* corresponding to the nozzle N, the droplet DR1, the droplet DR2_1, the droplet DR2_2, and the droplet DR3 are ejected from the nozzle N in this order, as illustrated in FIG. 6. In this case, ejection conditions such as flying speeds of the droplets DR1, DR2_1, DR2_2 and DR3 and timings of the ejection of the droplets DR1, DR2_1, DR2_2 and DR3 are set to cause a succeeding droplet among the droplets DR1, DR2_1, DR2_2 and DR3 to catch up with a droplet preceding the droplet among the droplets DR1, DR2_1, DR2_2 and DR3 before the preceding droplet and the succeeding droplet land on the medium M. Therefore, the combined droplet DRA is obtained by combining the droplets DR1, DR2_1, DR2_2 and DR3.

A8: Summary of First Embodiment

As described above, the liquid ejecting apparatus 100 includes the head 50 and the drive signal generating circuit 24 that is an example of the "drive signal generator". The head 50 includes the nozzles N from which ink that is an example of "liquid" is ejected toward the medium M, the pressure chambers C communicating with the nozzles N, and the drive elements 51*f* that change pressure applied to the ink in the pressure chambers C. The drive signal generating circuit 24 generates a drive signal Com for driving the drive elements 51*f*.

The drive signal Com includes a plurality of ejection pulses PA and an interpulse component EJ. The plurality of ejection pulses PA cause a plurality of droplets DR to be sequentially ejected from each of the nozzles N in such a way that the droplets DR are combined after being ejected from each of the nozzles N and before landing on the medium M. The plurality of ejection pulses PA are temporally aligned corresponding to the plurality of droplets DR. The interpulse component EJ is between two temporally continuous ejection pulses PA among the plurality of ejection pulses PA and is maintained at the reference potential V0.

Each of the plurality of ejection pulses PA includes a filling component EF and an ejection component ET. The filling components EF cause the pressure in the pressure chambers C to be negative. The ejection components ET cause the pressure in the pressure chambers C to be positive in such a way that the droplets DR are ejected from each of the nozzles N.

The ejection component ET1 of the first ejection pulse PA1 that is the earliest ejection pulse PA among the plurality of ejection pulses PA changes from the first potential V1 to the reference potential V0 and is temporally continuous with the interpulse component EJ1. The ejection components ET2 of the plurality of second ejection pulses PA2 that succeed the first ejection pulse PA1 among the plurality of ejection pulses PA change from the first potential V1 to the second potential V2. Each of the plurality of second ejection pulses PA2 includes the first vibration suppression component ED2 that succeeds the ejection component ET2 and dampens residual vibration in the pressure chambers C by changing from the second potential V2 to the reference potential V0. The third ejection pulse PA3 that is the latest ejection pulse PA among the plurality of ejection pulses PA includes the second vibration suppression component ED3 that succeeds the ejection component ET3 and reduces a change in the pressure in the pressure chambers C by changing from the second potential V2 to the third potential V3. The reference potential V0 is a potential between the first potential V1 and the second potential V2 and between the second potential V2 and the third potential V3.

In the liquid ejecting apparatus, the ejection component ET1 of the first ejection pulse PA1 changes from the first potential V1 to the reference potential V0, and the ejection components ET2 of the second ejection pulses PA2 and the ejection component ET3 of the third ejection pulse PA3 change from the first potential V1 to the second potential V2. Therefore, a speed at which the droplet DR1 is ejected according to the first ejection pulse PA1 can be lower than a speed at which the droplets DR2 are ejected according to the second ejection pulses PA2 and a speed at which the droplet DR3 is ejected according to the third ejection pulse PA3. In addition, since the end point of the ejection component ET1 of the first ejection pulse PA1 is directly temporally continuous with the interpulse component EJ1, it is possible to shorten the time length of the first ejection pulse PA1. Furthermore, since the ejection components ET2 and the ejection component ET3 change from the first potential V1 to the second potential V2, the drive signal Com can be easily designed, as compared with a case where potentials of ejection components ET2 and ET3 change in different ways.

Since each of the plurality of second ejection pulses PA2 includes the first vibration suppression component ED2, it is possible to shorten the time length of the interpulse component EJ2 between the two temporally continuous second ejection pulses PA2, and shorten the time length of the interpulse component EJ3 between the latest second ejection pulse PA2 among the plurality of second ejection pulse PA2 and the third ejection pulse PA3.

Since the third ejection pulse PA3 includes the second vibration suppression component ED3, it is possible to reduce the effect of residual ejection on the next unit time Tu. Since the first vibration suppression components ED2 of the second ejection pulses PA2 change from the second potential V2 to the reference potential V0 after the ejection components ET2, and the ejection component ET3 of the third ejection pulse PA3 changes from the second potential V2 to the third potential V3, the effect of residual vibration on the next unit time Tu is suitably reduced. Therefore, it is possible to easily increase the printing speed.

In the present embodiment, as described above, the plurality of second ejection pulses PA2 are in the same shape. Therefore, the drive signal Com is easily designed, as compared with a case where waveforms of a plurality of second ejection pulses PA2 are different from each other.

As described above, the ejection components ET of the ejection pulses PA other than the first ejection pulse PA1 among the plurality of ejection pulses PA are in the same shape. Therefore, the drive signal Com is easily designed, as compared with a case where all waveforms of a plurality of ejection pulses PA are different from each other.

As described above, when the period of natural vibration in the pressure chambers C is TC, the time length T1 of the interpulse component EJ1 between the end point of the ejection component ET1 of the first ejection pulse PA1 and the start point of the filling component EF2 of the earliest second ejection pulse PA2_1 among the plurality of second ejection pulses PA2 is preferably in a range from 0.8 TC to 0.9 TC. In this case, the time length T1 of the interpulse component EJ1 can be shortened in such a way that the droplet DR2_1 is suitably ejected according to the second ejection pulse PA2_1.

Furthermore, as described above, the time length T2 of the period from the end point of the first vibration suppression component ED2 of the latest second ejection pulse P2_2 that is among the plurality of second ejection pulses PA2 and immediately precedes the third ejection pulse PA3 to the start point of the filling component EF3 of the third ejection pulse PA3 is preferably in a range from 1.1 TC to 1.4 TC. In this case, the time length T2 can be shortened in such a way that the droplet DR3 is suitably ejected according to the third ejection pulse PA3.

Furthermore, as described above, the time length T3 of the period from the start point of the ejection component ET1 of the first ejection pulse PA1 to the start point of the ejection component of the earliest second ejection pulse PA2_1 among the plurality of second ejection pulses PA2 is preferably in a range of 1.3 TC to 1.7 TC. In this case, the time length T3 can be shortened in such a way that the droplet DR2_1 is suitably ejected according to the second ejection pulse PA2_1.

Furthermore, as described above, the time length T4 of the period of the start point of the ejection component ET2 of the latest second ejection pulse PA2_2 that is among the plurality of second ejection pulses PA2 and immediately precedes the third ejection pulse PA3 to the start point of the ejection component ET3 of the third ejection pulse PA3 is preferably in a range of 2.7 TC to 3.1 TC. In this case, the time length T4 can be shortened in such a way that the droplet DR3 is suitably ejected according to the third ejection pulse PA3.

Furthermore, as described above, the viscosity of the liquid in the pressure chambers C is preferably in a range of 9 mPa·S to 10 mPa·S. In this case, it is possible to obtain a noticeable effect of using the drive signal Com described above.

B: Second Embodiment

A second embodiment of the present disclosure is described below. In the second embodiment exemplified below, the signs used for the explanation of the first embodiment are used for components whose operations and functions are similar to those described in the first embodiment, and details of the components are not described.

Figure 7:
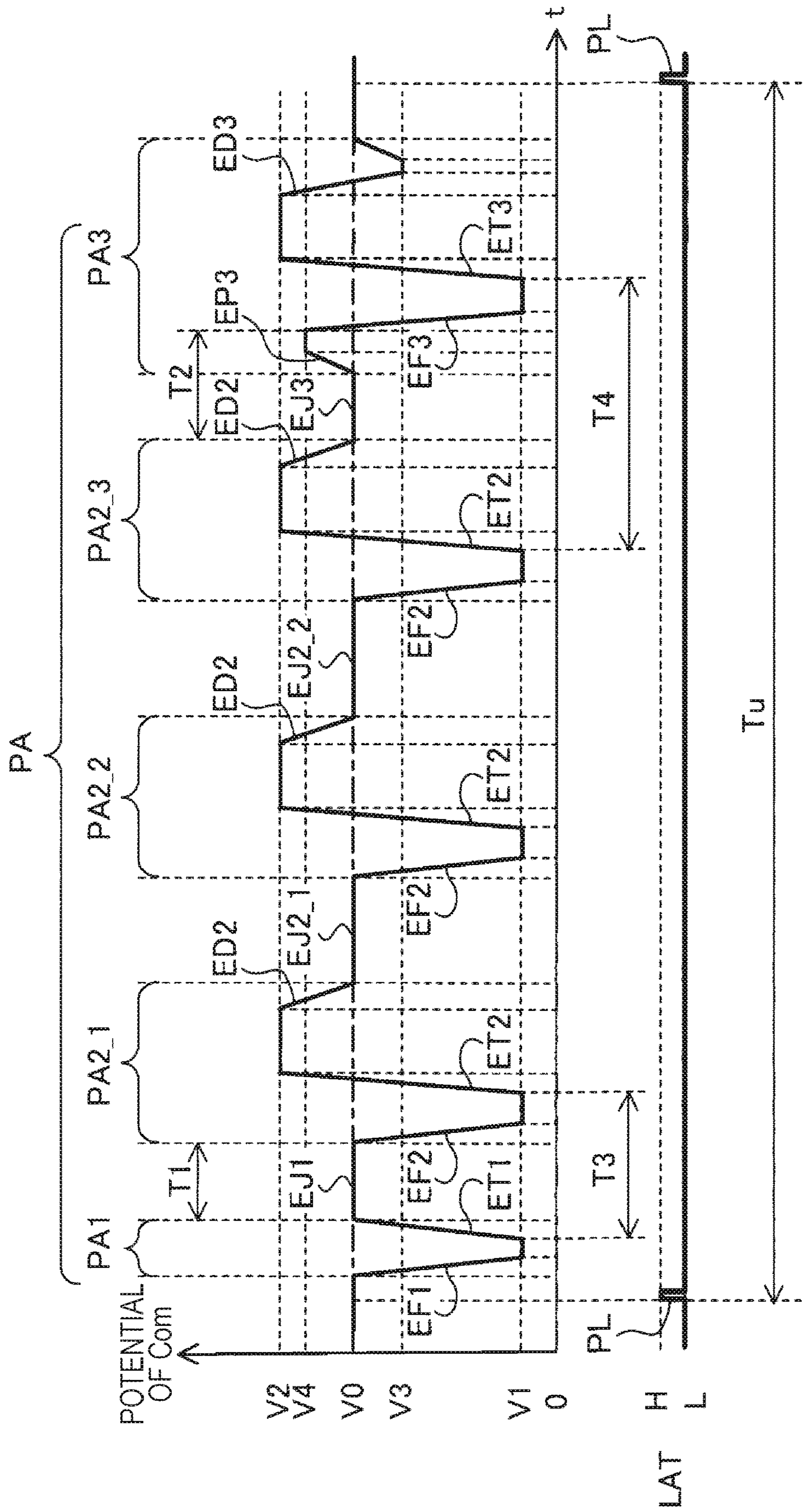
FIG. 7 is a diagram illustrating a drive signal used in a second embodiment.

FIG. 7 is a diagram illustrating a drive signal Com used in the second embodiment. The drive signal Com according to the second embodiment is the same as the drive signal Com according to the first embodiment, except that the drive signal Com according to the second embodiment includes a third ejection pulse PA3 whose waveform is different from that in the first embodiment, and further includes a second ejection pulse PA2_3.

The drive signal Com according to the present embodiment includes a first ejection pulse PA1, an interpulse component EJ1, a second ejection pulse PA2_1, an interpulse component EJ2_1, a second ejection pulse PA2_2, an interpulse component EJ2_2, the second ejection pulse PA2_3, an interpulse component EJ3, and the third ejection pulse PA3 in this order in a unit time Tu.

The second ejection pulse PA2_3 includes a filling component EF2, an ejection component ET2, and a first vibration suppression component ED2 in this order in a similar manner to each of the second ejection pulses PA2 described in the first embodiment. In the second ejection pulse PA2_3, the filling component EF2 is temporally continuous with the ejection component ET2 via a fixed-potential component maintained at a first potential V1, and the ejection component ET2 is temporally continuous with the first vibration suppression component ED2 via a fixed-potential component maintained at a second potential V2. Each of the interpulse components EJ2_1 and EJ2_2 is maintained at a reference potential V0 in a similar manner to the interpulse components EJ2 described in the first embodiment.

The third ejection pulse PA3 according to the present embodiment includes a preparation component EP3, a filling component EF3, an ejection component ET3, and a second vibration suppression component ED3 in this order. The preparation component EP3 changes from the reference potential V0 to a fourth potential V4. The fourth potential V4 is a potential between the reference potential V0 and the second potential V2. With the addition of the preparation component EP4, the filling component EF3 according to the present embodiment changes from the fourth potential V4 to the first potential V1. The preparation component EP3 is temporally continuous with the filling component EF3 via a fixed-potential component maintained at the fourth potential V4. The filling component EF3 is temporally continuous with the ejection component ET3 via a fixed-potential component maintained at the first potential V1. The ejection component ET3 is temporally continuous with the second vibration suppression component ED3 via a fixed-potential component maintained at the second potential V2.

The change in the potential of the filling component EF3 according to the present embodiment, that is, the difference between the first potential V1 and the fourth potential V4 is larger than the change in the potential of the filling component EF3 according to the first embodiment, that is, the difference between the reference potential V0 and the first potential V1. Therefore, a speed at which a droplet DR3 is ejected according to the third ejection pulse PA3 can be higher than that in the first embodiment. As a result, since the second ejection pulse PA2_3 is added to make a larger combined droplet than the combined droplet described in the first embodiment, even when a period from the first ejection pulse PA1 to the latest third ejection pulse PA3 is long, it is possible to suitably combine the droplet DR3 ejected according to the third ejection pulse PA3 with a droplet DR preceding the droplet DR3.

In the second embodiment as well, the amount of a combined droplet DRA obtained by combining a plurality of droplets DR can be large. In the present embodiment, as described above, the filling component EF2 of each of the plurality of second ejection pulses PA2 changes from the reference potential V0 to the first potential V1. The third ejection pulse PA3 includes the preparation component EP3 that changes from the reference potential V0 to the fourth potential V4 before the filling component EF3. The filling component EF3 of the third ejection pulse PA3 changes from the fourth potential V4 to the first potential V1. The reference potential V0 is a potential between the fourth potential V4 and the first potential V1. Since the preparation component EP3 is used, the speed at which the droplet DR3 is ejected according to the third ejection pulse PA3 can be higher than a speed at which a droplet DR2 is ejected according to each of the second ejection pulses PA2.

C: Third Embodiment

A third embodiment of the present disclosure is described below. In the third embodiment exemplified below, the signs used for the explanation of the first embodiment are used for components whose operations and functions are similar to those described in the first embodiment, and details of the components are not described.

Figure 8:
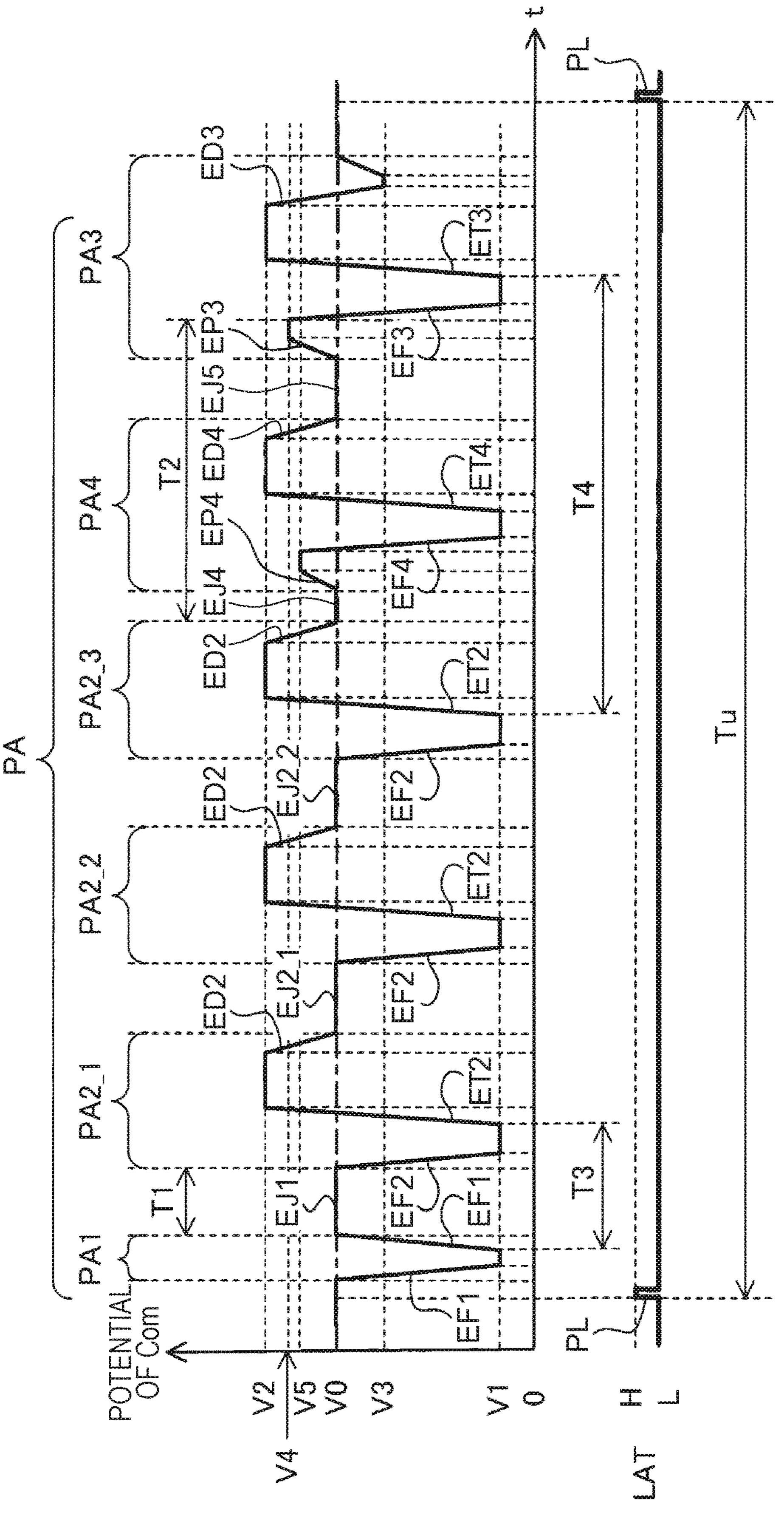
FIG. 8 is a diagram illustrating a drive signal used in a third embodiment.

FIG. 8 is a diagram illustrating a drive signal Com used in the third embodiment. The drive signal Com according to the third embodiment is the same as the drive signal Com according to the first embodiment, except that the drive signal Com according to the third embodiment includes a third ejection pulse PA3 with a waveform different from that in the first embodiment and further includes a second ejection pulse PA2_3 and a fourth ejection pulse PA4. The drive signal Com according to the third embodiment is the same as the drive signal Com according to the second embodiment, except that the drive signal Com according to the third embodiment includes the fourth ejection pulse PA4.

The drive signal Com according to the third embodiment includes a first ejection pulse PA1, an interpulse component EJ1, a second ejection pulse PA2_1, an interpulse component EJ2_1, a second ejection pulse PA2_2, an interpulse component EJ2_2, the second ejection pulse PA2_3, an interpulse component EJ4, the fourth ejection pulse PA4, an interpulse component EJ5, and the third ejection pulse PA3 in this order in a unit time Tu.

The fourth ejection pulse PA4 is an ejection pulse PA immediately preceding the third ejection pulse PA3 among the plurality of ejection pulses PA in the unit time Tu. The fourth ejection pulse PA4 includes a preparation component EP4, a filling component EF4, an ejection component ET4, and a vibration suppression component ED4 in this order. The preparation component EP4 changes from a reference potential V0 to a fifth potential V5. The fifth potential V5 is a potential between the reference potential V0 and a fourth potential V4. The filling component EF4 changes from the fifth potential V5 to a first potential V1. The ejection component ET4 changes from the first potential V1 to a second potential V2. The vibration suppression component ED4 changes from the second potential V2 to the reference potential V0. The preparation component EP4 is temporally continuous with the filling component EF4 via a fixed-potential component maintained at the fifth potential V5. The filling component EF4 is temporally continuous with the ejection component ET4 via a fixed-potential component maintained at the first potential V1. The ejection component ET4 is temporally continuous with the vibration suppression component ED4 via a fixed-potential component maintained at the second potential V2.

The change in the potential of the filling component EF4, that is, the difference between the first potential V1 and the fifth potential V5 is larger than the change in the potential of the filling component EF2 of each of the second ejection pulses PA2, that is, the difference between the reference potential V0 and the first potential V1. Therefore, a speed at which a droplet is ejected according to the third ejection pulse PA3 can be higher than a speed at which a droplet is ejected according to each of the second ejection pulses PA2. As a result, a droplet ejected according to the fourth ejection pulse PA4 can be suitably combined with a droplet DR preceding the droplet ejected according to the fourth ejection pulse PA4.

In addition, the change in the potential of the filling component EF4 according to the present embodiment, that is, the difference between the first potential V1 and the fifth potential V5 is larger than the change in the potential of the filling component EF3 according to the second embodiment, that is, the difference between the first potential V1 and the fourth potential V4. Therefore, a speed at which the droplet is ejected according to the fourth ejection pulse PA4 can be lower than the speed at which the droplet DR3 is ejected according to the third ejection pulse PA3. As a result, the droplet ejected according to the third ejection pulse PA3 can be suitably combined with the droplet ejected according to the fourth ejection pulse PA4.

In the third embodiment as well, the amount of a combined droplet DRA obtained by combining a plurality of droplets DR can be large. In the present embodiment, as described above, the fourth ejection pulse PA4 immediately preceding the latest third ejection pulse PA3 among the plurality of ejection pulses PA includes the preparation component EP4 that changes from the reference potential V0 to the fifth potential V5 before the filling component EF4. The filling component EF4 of the fourth ejection pulse PA4 changes from the fifth potential V5 to the first potential V1. The fifth potential V5 is a potential between the reference potential V0 and the fourth potential V4. That is, the change in the potential of the filling component EF4 of the fourth ejection pulse PA4, that is, the difference between the first potential V1 and the fifth potential V5 is larger than the difference between the reference potential V0 and the first potential V1 of the filling component EF2 of each of the second ejection pulses PA2 before the fourth ejection pulse PA4 and is smaller than the difference between the fourth potential V4 and the first potential V1 of the filling component EF3 of the third ejection pulse PA3. Since the fourth ejection pulse PA4 is used, the speed at which the droplet DR is ejected according to the fourth ejection pulse PA4 can be higher than the speed at which the droplet DR2 is ejected according to each of the second ejection pulses PA2, and can be lower than the speed at which the droplet DR3 is ejected according to the third ejection pulse PA3. As a result, since the second ejection pulse PA2_3 and the fourth ejection pulse PA4 are added to make a larger combined droplet than the combined droplets described in the first and second embodiments, even when a period from the earliest first ejection pulse PA1 to the latest third ejection pulse PA3 is long, the droplet DR3 ejected according to the third ejection pulse PA3 can be suitably combined with a droplet DR preceding the droplet DR3.

Furthermore, as described above, the fourth ejection pulse PA4 includes the vibration suppression component ED4. The vibration suppression component ED4 changes from the second potential V2 to the reference potential V0 and is temporally continuous with the start point of the interpulse component EJ5, and dampens residual vibration in the pressure chambers C. Therefore, it is possible to shorten the time length of the interpulse component EJ5.

D: Modifications

The embodiments described above can be variously modified. Specific modifications that are applicable to the embodiments are exemplified below. Aspects arbitrarily selected from the following examples can be appropriately combined to the extent that the aspects do not contradict each other.

D1: First Modification

In each of the embodiments described above, the number of ejection pulses PA in the unit time Tu is in a range from 4 to 6, but is not limited thereto and may be 7 or more.

D2: Second Modification

In each of the embodiments, each of the nozzles N has two sections with different widths, but is not limited thereto. For example, each of the nozzles N may have a fixed width or may have three or more sections with different widths.

D3: Third Modification

The configuration of the head chip 51 is not limited to the example illustrated in FIG. 3. The head chip 51 may have any configuration.

D4: Fourth Modification

In each of the embodiments, the serial-type liquid ejecting apparatus 100 that causes the carriage 41 in which the head 50 is installed to reciprocate is exemplified. However, in the present disclosure, a line-type liquid ejecting apparatus having a plurality of nozzles N arranged over the entire width of the medium M may be provided.

D5: Fifth Modification

The liquid ejecting apparatus 100 exemplified in each of the embodiments may be used for an apparatus dedicated for printing and various apparatuses such as a facsimile apparatus and copying apparatus. The use of the liquid ejecting apparatus 100 exemplified in each of the embodiments of the present disclosure is not particularly limited. The use of the liquid ejecting apparatus 100 exemplified in each of the embodiments is not limited to printing. For example, the liquid ejecting apparatus 100 according to each of the embodiments may be a liquid ejecting apparatus that ejects a solution of a colorant and is used as a manufacturing apparatus that forms a color filter for a display device such as a liquid crystal display panel. In addition, the liquid ejecting apparatus 100 according to each of the embodiments may be a liquid ejecting apparatus that ejects a solution of a conductive material and is used as a manufacturing apparatus that forms a wiring and an electrode of a wiring substrate.

Furthermore, the liquid ejecting apparatus 100 according to each of the embodiments may be a liquid ejecting apparatus that ejects a solution of an organic matter related to a biological body and is used as a manufacturing apparatus that forms, for example, a biochip.

What is claimed is:

1. A liquid ejecting apparatus comprising:

a head including a nozzle from which liquid is ejected toward a medium, a pressure chamber communicating with the nozzle, and a drive element that is configured to change pressure applied to the liquid in the pressure chamber; and a drive signal generator that is configured to generate a drive signal for driving the drive element, wherein the drive signal includes a plurality of ejection pulses that are temporally aligned corresponding to a plurality of droplets that are to be combined after being ejected from the nozzle and before landing on the medium, and cause the plurality of droplets to be sequentially ejected, and an interpulse component that is between two temporally continuous ejection pulses among the plurality of ejection pulses and is maintained at a reference potential, the plurality of ejection pulses include filling components that cause the pressure in the pressure chamber to be negative, and ejection components that cause the pressure in the pressure chamber to be positive in such a way that droplets are ejected from the nozzle, when an earliest ejection pulse among the plurality of ejection pulses is a first ejection pulse, a plurality of ejection pulses that succeed the first ejection pulse among the plurality of ejection pulses are a plurality of second ejection pulses, and a latest ejection pulse among the plurality of ejection pulses is a third ejection pulse, the ejection component of the first ejection pulse changes from a first potential to the reference potential and is temporally continuous with an interpulse component, the ejection components of the plurality of second ejection pulses and the ejection component of the third ejection pulse change from the first potential to a second potential, the plurality of second ejection pulses include first vibration suppression components that succeed the ejection components of the second ejection pulses and dampen residual vibration in the pressure chamber by changing from the second potential to the reference potential, the third ejection pulse includes a second vibration suppression component that reduces the change in the pressure in the pressure chamber by changing from the second potential to a third potential, and the reference potential is a potential between the first potential and the second potential and between the second potential and the third potential.

2. The liquid ejecting apparatus according to claim 1, wherein the plurality of second ejection pulses are in a same shape.

3. The liquid ejecting apparatus according to claim 1, wherein the ejection components of the ejection pulses other than the first ejection pulse among the plurality of ejection pulses are in a same shape.

4. The liquid ejecting apparatus according to claim 1, wherein when a period of natural vibration in the pressure chamber is TC, a time length of the interpulse component immediately succeeding an end point of the ejection component of the first ejection pulse and immediately preceding a start point of the filling component of the earliest second ejection pulse among the plurality of second ejection pulses is in a range from 0.8 TC to 0.9 TC.

5. The liquid ejecting apparatus according to claim 1, wherein when a period of natural vibration in the pressure chamber is TC, a time length of a period from an end point of the first vibration suppression component of the latest second ejection pulse among the plurality of second ejection pulses to a start point of the filling component of the third ejection pulse is in a range from 1.1 TC to 1.4 TC.

6. The liquid ejecting apparatus according to claim 1, wherein when a period of natural vibration in the pressure chamber is TC, a time length of a period from a start point of the ejection component of the first ejection pulse to a start point of the ejection component of the earliest second ejection pulse among the plurality of second ejection pulses is in a range from 1.3 TC to 1.7 TC.

7. The liquid ejecting apparatus according to claim 1, wherein when a period of natural vibration in the pressure chamber is TC, a time length of a period from a start point of the ejection component of the latest second ejection pulse among the plurality of second ejection pulses to a start point of the ejection element of the third ejection pulse is in a range from 2.7 TC to 3.1 TC.

8. The liquid ejecting apparatus according to claim 1, wherein the filling components of the plurality of second ejection pulses change from the reference potential to the first potential, the third ejection pulse includes a preparation component that changes from the reference potential to a fourth potential before the filling component of the third ejection pulse, the filling component of the third ejection pulse changes from the fourth potential to the first potential, and the reference potential is a potential between the fourth potential and the first potential.

9. The liquid ejecting apparatus according to claim 8, wherein when an ejection pulse immediately preceding the third ejection pulse among the plurality of ejection pulses is a fourth ejection pulse, the fourth ejection pulse includes a preparation component that changes from the reference potential to a fifth potential before the filling component of the fourth ejection pulse, the filling component of the fourth ejection pulse changes from the fifth potential to the first potential, the reference potential is a potential between the fifth potential and the first potential, and the fifth potential is a potential between the fourth potential and the first potential.

10. The liquid ejecting apparatus according to claim 9, wherein the fourth ejection pulse includes a third vibration suppression component that changes from the second potential to the reference potential and is temporally continuous with a start point of an interpulse component, and dampens residual vibration in the pressure chamber.

11. The liquid ejecting apparatus according to claim 1, wherein viscosity of the liquid in the pressure chamber is in a range from 9 mPa·s to 10 mPa·s.

* * * * *